United States Patent Office 3,382,434
Patented May 7, 1968

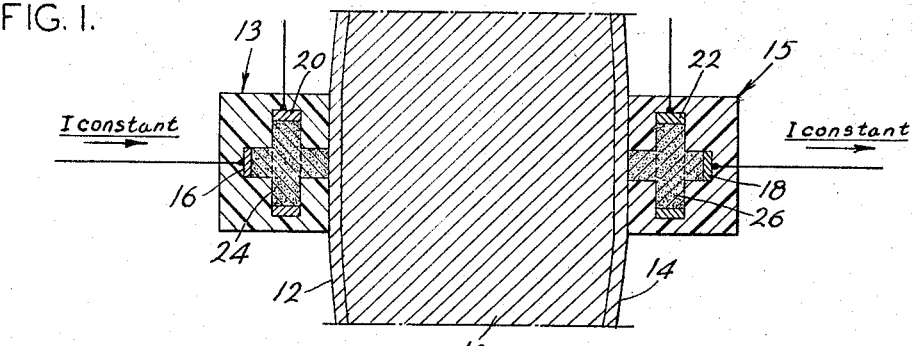
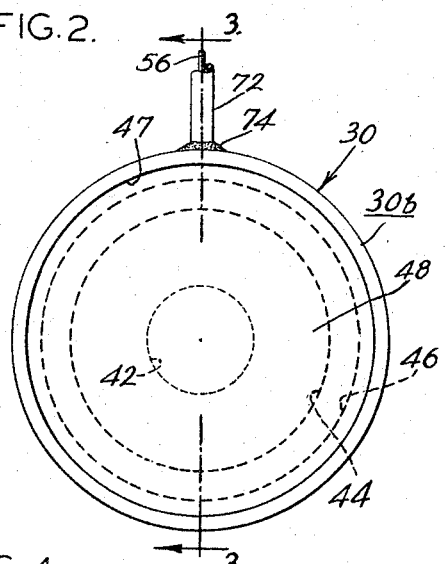
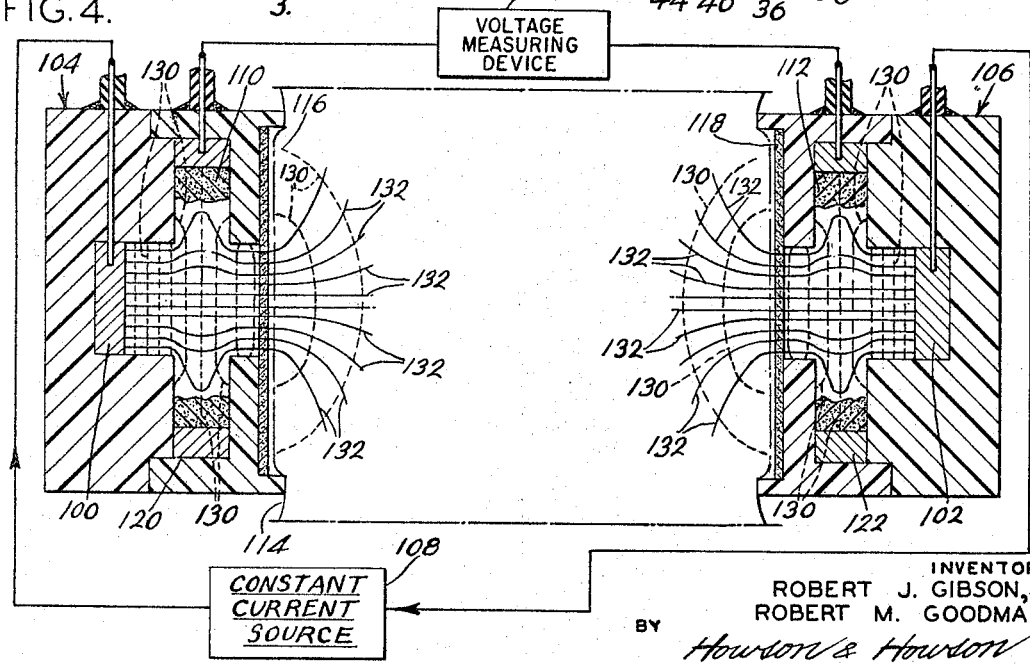

3,382,434
ELECTRODE SYSTEM EMPLOYING SEPARATE CURRENT AND POTENTIAL ELECTRODES
Robert J. Gibson, Jr., Narberth, and Robert M. Goodman, Elkins Park, Pa., assignors to The Franklin Institute, Philadelphia, Pa., a corporation of Pennsylvania
Filed Aug. 10, 1964, Ser. No. 388,466
8 Claims. (Cl. 324—64)

ABSTRACT OF THE DISCLOSURE

An electrode system for use in measuring conditions in a conductive medium is provided including a first electrode apparatus and a second electrode apparatus adapted to be positioned in conductive contact with the conductive medium. Each electrode apparatus includes a housing having a reservoir for electrolyte and an opening from a reservoir, the electrolyte providing an electrical path through the reservoir into the opening. A current electrode is positioned in the reservoir and the housing is provided with a recess from the reservoir located between the position of the current electrode and the conductive medium under consideration. A potential electrode is positioned in the recess in contact with the electrolyte, the potential electrode in the recess being arranged such that the electrical path from the current electrode through the opening to the conductive medium will be substantially unaffected by the potential electrode.

---

The present invention relates to a novel electrode system; and more particularly, it relates to an electrode system especially adapted for use with electrodes applied to skin for measuring conditions in living organisms.

The present invention belongs to the class of electrode systems used in measuring Galvanic Skin Reflex, hereinafter referred to as GSR, also known as Galvanic Skin Response, which is an electrical measure of a property of the skin. GSR is divisible into two distinct electrical properties, the endosomatic and the exosomatic. These electrical properties must be measured separately electrically and pose different problems in measurement technology. The endosomatic GSR, hereinafter referred to as GSR–v is a small voltage, on the order of a few millivolts, appearing between two skin surfaces of the body. This measurement to be accurate requires measuring electrodes of very low self-generated voltage and good stability of voltage as well as a high impedance in the voltage measuring circuit. Exosomatic GSR, hereinafter referred to as GSR–r, is a resistance, on the order of 10,000–500,000 ohms, appearing between two skin sites on the body. This measurement requires electrodes of low, stable, surface resistance and reasonable voltage stability.

In such systems of the class with which the present invention is primarily concerned, many difficulties have been experienced in providing a system to accurately measure such conditions as GSR–r, and the like. The potential measurements of the type referred to have been found to be inaccurate due to spurious electrical effects. In the measuring of GSR–v and GSR–r, serious difficulties have been experienced with the electrode materials, in general, related to electrode characteristic instability. It has been found that large variations in electrode resistance exists due to a non-equilibrated skin-electrolyte-electrode interface. Also, variable self-generated potentials by the electrodes themselves have contributed to inaccurate measurements.

In accordance with the present invention for measuring conditions in living organisms, a novel electrode system is provided having a housing including bounding walls defining a reservoir of electrolyte in the housing with an opening from the reservoir to the outside of the housing. In accordance with another feature of the present invention a pair of spaced electrodes are located in the reservoir in contact with the electrolyte. The bounding walls are insulators and the electrolyte provides an electrical path from the electrodes to the outside of the housing through said opening. In the preferred embodiment of the invention, the pair of spaced electrodes are located in the reservoir, one in a recess in the bounding walls between the opening in the housing and the other electrode, so that the electrical path from the last mentioned other electrode through the electrolyte to the opening will be substantially unaffected by the one electrode in the recess.

In accordance with the preferred use of the present invention, two such electrode systems are employed to measure the electrical conditions of the living organism between the two electrode systems. Accordingly, a predetermined current distribution may be generated between a current electrode in each electrode system. The other electrode in each electrode system may be inserted in a recess at a point along the current path, one on each side of the organism, to measure the voltage drop between the two points. It has been found that by this arrangement, the points at which the voltage is measured draw substantially no current and do not appreciably disturb or distort the current field.

For a better understanding of the present invention and its objectives, reference is made to the following drawings wherein:

FIG. 1 illustrates a diagrammatic arrangement to measure the galvanic skin resistance of a body using the electrode apparatus of the present invention;

FIG. 2 shows an end elevational view of the housing for the electrode apparatus of the present invention;

FIG. 3 is a detail sectional view of the electrode apparatus taken along line 3—3 of FIG. 2; and FIG. 4 is a schematic diagram of an over-all system embodying the present invention and illustrating the equipotential and current-distribution lines through the electrode apparatuses and into a representative conductive medium.

Referring first to FIG. 1, an illustrative arrangement of the potential method for measuring skin resistance GSR–r, using the electrode system of the present invention, is shown. Here a portion of a human body, generally designated 10, is shown having skin surfaces, designated 12 and 14, against which electrode systems 13 and 15 are placed. The over-all system of the present invention shown employs the generation of a linear current-distribution at the pair of electrodes 16 and 18 in electrode systems 13 and 15, respectively, coupled with the insertion of two electrodes 20 and 22, in electrode systems 13 and 15, respectively, between the current electrodes 16 and 18 to measure the voltage drop therebetween. This system is premised on the principle that the voltage drop between any two points along a constant current field is directly related to the resistance between the points. This assumption is correct so long as the points at which the voltage is measured draw substantially no current and do not appreciably disturb or distort the current field, which is true in the system of the present invention. This assumption, to be accurate, also assumes that a voltage measuring device having a high impedance is used. Accordingly, current is applied through electrodes 16 and 18 and is conducted to and from the skin surface by means of electrolyte 24 and 26 in electrode systems 13 and 15, respectively. Then, the resistance between electrodes 20 and 22 can be expressed as follows:

$$R = \frac{E}{I_{\text{constant}}}$$

In the path between the potential electrodes 20 and 22, the resistance is considered to be composed of five separate parts: a very small resistance of the electrolyte between electrode 20 and the skin 12 ($R_{12-20}$), a large resistance of skin 12 ($R_{skin\ 12}$), a very small internal resistance of body 10 ($R_{body}$), a large resistance of skin 14 ($R_{skin\ 14}$), and a very small resistance due to the electrolyte between skin 14 and electrode 22 ($R_{14-22}$). In the system of the present invention the very small resistance due to the electrolyte between the electrodes and the skin and the very small internal resistance of the body are much much less than the resistance of the skin. Hence, for all practical purposes the electrolyte and internal body resistances may be neglected in comparison to the skin resistance.

These assumptions permit the following:

$$R_{20-22} = R_{12-20} + R_{skin\ 12} + R_{body} + R_{skin\ 14} + R_{14-22}$$

Since $$R_{skin\ 12} \cong R_{skin\ 14}$$

and $$R_{skin\ 12} \gg R_{12-20}$$

and $$R_{skin\ 12} \gg R_{14-22}$$

$$R_{skin\ 12} \gg R_{body}$$

then $$R_{20-22} \cong R_{skin\ 12} + R_{skin\ 14} = R_{skin}$$

Hence, it is essentially true to state that $$R_{skin} = \frac{E}{I_{constant}}$$

In the last equation $R_{skin}$ is normally called the skin resistance. It should be noted that sometimes this resistance is stated in terms of its reciprocal, the skin conductance ($G = 1/r$). In measuring skin conductance, $G_{skin}$, a constant voltage is maintained and the current measured is proportionally related to the skin conductance. The conductance is expressed as follows:

$$G_{skin} = \frac{I}{V_{constant}}$$

As can be seen in FIGS. 2 and 3, the electrode system is shown having a support cylindrical housing, generally designated 30, made from an insulating material such as resinous material. The housing is formed by two portions 30a and 30b to provide a housing for electrodes and electrolyte. The resinous material comprising the cylindrical housing is fabricated to form portion 30a with a circular disc shaped electrode 32 axially located therein and having a cylindrical recess 34 of substantially the same diameter as the disc electrode 32 extending from a face of the electrode through surface 35 of portion 30a. The disc shape of electrode 32 is used to provide a generally flat surface in recess 34, but electrode 32 could be round or some other shape. Portion 30a has flat parallel surfaces 35 and 37 at opposite ends thereof. The cylindrical surface of portion 30a has a reduced diameter section 36 adjacent surface 35 to form a sealing surface with a section of portion 30b. Between the cylindrical surface of portion 30a and the reduced diameter section 36, shoulder 38 is provided.

Portion 30b of the housing is tubular in form having a radial partition 40 with an axial bore 42 through the partition of approximately the same diameter as the disc electrode 32. A ring electrode 44 is fabricated so that the outer diameter of the ring conforms to the inner diameter 46 of the wall forming the cylindrical portion 30b, which inner diameter is the section of portion 30b that frictionally engages section 36 of portion 30a to seal the portions of the housing tightly together. Shoulder 38 of portion 30a serves as an abutment between the portions of the housing. The inner diameter of the wall forming the cylindrical portion 30b provides a recess 47 on the opposite side of the partition 40 from the ring electrode 44.

The opening inside the housing formed by the axial bore and recesses provides a reservoir which is filled with electrolyte 60, which contacts electrodes 32 and 44. Ashless filter paper 48 impregnated with electrolyte is placed within recess 47 and rests against surface 51 of partition 40. The filter paper is held in place by snugly fitting within recess 47 and by the cohesive forces of the electrolyte 60 in the reservoir. The filter paper 48 prevents contamination of the electrolyte and prevents the intrusion of foreign matter into the reservoir. The filter paper impregnated with electrolyte allows good electrical contact between the electrolyte in the reservoir and the skin against which the electrode system is placed. The electrolyte, preferably being viscous so that it will not flow from the reservoir, may also be placed over the outside of the filter paper, as shown in dot and dashed lines in FIG. 3, if desired for better electrical contact. The filter paper is fixed in place after the reservoir is filled with electrolyte. It will be observed that the filter paper may be omitted and the electrolyte in the reservoir placed directly in contact with the skin of the living organism. However, if the filter paper is used for sanitary purposes, it can be easily replaced with a new piece between each use of the system.

The electrodes 32 and 44 are provided with electrical connectors 54 and 56, respectively, extending from the electrodes through the housing. Insulative coverings 70 and 72 are provided for the connectors 54 and 56, respectively, and the insulative coverings are sealed to the cylindrical walls of the housing by an epoxy resin 74.

In the preferred manner of connecting the electrode apparatus, the disc electrode 32 is connected to a source of current of predetermined value and the ring electrode 44 is connected to a means for measuring voltage. By this arrangement, the current is conducted through the electrolyte and the filter paper impregnated with electrolyte which is in contact with the skin. The novel arrangement of the electrode apparatus is such that the points at which the voltage is measured draw substantially no current and do not appreciably disturb or distort the current field.

In the novel electrode system of the present invention a special method of producing the electrodes is employed, so that the electrodes are stable, relatively low in resistance and are productive of substantially no self-generated potentials. The electrodes are produced as follows: the basic electrode metal is ultra pure silver which is approximately 99.999+% pure. This material is fabricated to the proper size. All of the electrode surfaces of the material are etched in pure concentrated nitric acid for ten seconds, washed for ten minutes in deionized distilled water which has an initial conductivity of less than or equal to 0.3 micromho per cm.; washed in a second bath of deionized distilled water for fifteen minutes; and washed in a third bath of deionized distilled water for at least four hours. The electrodes are next dried with clean, ashless filter paper and stored in a sterile closed container until near time when they are needed for use. The electrodes are then placed in 0.1 N solution of pure hydrochloric acid and deionized distilled water, and plated with a current density of 1.5 ma./cm.$^2$ for a period of thirty-five to sixty minutes, the cathode being a platinum wire cleaned with concentrated pure nitric acid and carefully washed with deionized distilled water. The plated electrodes of silver-silver chloride are washed briefly with deionized distilled water and placed in a special saline solution of 0.15 N sodium chloride saturated with silver chloride until ready for installation in the electrode system.

After the electrode system has been assembled, as shown in FIG. 3, it is filled with electrolyte and the ashless opening to the reservoir. The two electrode systems are placed in a container of electrolyte, and all electrodes are short-circuited together and are allowed to stabilize for approximately 24 hours before they are ready for use.

It is believed that the maintenance of the same electrolyte-electrode interface is of great consequence for maintaining equilibrium and stable operating characteristics of the electrode system. To maintain equilbrium the electrode systems should have the internal reservoir filled with electrolyte which is to remain in the reservoir throughout the lifetime of use of the system. The only change that need be made to the electrode system is to supply new electrolyte as required by usage to the filter paper or to replace the filter paper between each use of the system.

The arrangement shown in FIG. 4, which is similar to FIG. 1, illustrates a schematic diagram of an over-all system embodying the present invention and also illustrates the equi-potential and current-distribution lines through the electrode systems and into a representative conductive medium. As schematically represented, the disc electrodes 100 and 102 in the electrode system, generally designated 104 and 106, respectively, are connected to a constant current source 108 for providing a predetermined value of current. The current is conducted through electrolytes 110 and 112 in electrode apparatuses 104 and 106, respectively, and into a representative conductive medium, generally designated 114, representing the conductance of the skin of a human body. As can be seen, the electrode systems are placed firmly against the representative conductive medium in order to have the filter papers 116 and 118 impregnated with electrolyte in electrode systems 104 and 106, respectively, in contact with the representative conductive medium. The ring electrodes 120 and 122 in electrode systems 104 and 106, respectively, are connected to a voltage measuring device 124, typically a high impedance device which draws substantially no current, for measuring the potential between electrodes 120 and 122. The lines 130 represent the equi-potential lines through the electrolytes 110 and 112 and into the representative conductive medium 114, and the lines 132 represent the current-distribution lines through the electrolytes 110 and 112 and into the representative conductive medium 114.

As can be seen in the electrode system, the ring electrodes are spaced in recesses at points along the current path measuring the voltage. This arrangement is important since the potential is measured in a recess away from the current path through the electrolyte from the current electrode and thereby does not appreciably affect the current flow. The voltage electrode must be sufficiently recessed so that no current distribution lines contact the voltage electrode; otherwise, current will be drawn by the voltage electrode and the current field will be disturbed. Also, if current passes from the current electrode to the voltage electrode plating will result where current enters the voltage electrode and etching will occur where current leaves the voltage electrode.

The techniques employed in the present invention of the electrode preparation, stabilization of the electrode-electrolyte interface and the electrode system design has been found to result in a remarkable stable over-all D.C. electrode system for measurement of GSR–v, GSR–r, and the like.

Either an A.C. or D.C. voltage may be used as the current source and the resulting voltage measured between the potential ring electrodes by appropriate high impedance voltage measuring means. It is also to be noted that in a simple A.C. or D.C. GSR measurement, the ring and disc electrodes may be connected together for use as a single electrode in the constant current or voltage methods well known to those skilled in the art. With the electrodes connected together in each electrode system, the GRS–r can be calculated by using a constant current source where the voltage is measured at the terminals, or by using a constant voltage source where the current is measured at the terminals. By the arrangement of connecting the electrodes together in each electrode system with no voltage or current source employed, the system can be used to measure the body-generated bio-potentials.

Modifications of the electrode system and the over-all system described herein will occur to those skilled in the art. All such modifications are intended to be within the scope and spirit of the present invention as defined by the appended claims.

We claim:

1. An electrode system for use in measuring conditions in a conductive medium comprising:
  a first electrode apparatus and a second electrode apparatus adapted to be positioned in conductive contact with said conductive medium, each of said electrode apparatuses comprising:
    a housing including bounding walls providing insulators and defining a reservoir for electrolyte in said housing, said housing having an opening from said reservoir to the outside of said housing, said electrolyte being adapted to provide an electrical path in said reservoir;
    a current electrode in said reservoir adapted to contact said electrolyte in said reservoir,
    said housing walls defining a recess from said reservoir located between the position of said current electrode in said resevoir and said conductive medium,
    a potential electrode positioned in said recess and adapted to contact said electrolyte, said potential electrode in said recess being positioned such that the electrical path from said current electrode through said opening to said conductive medium will be substantially unaffected by said potential electrode.

2. The electrode system of claim 1 further comprising means for providing a predetermined current through said current electrodes of said first and second electrode apparatuses.

3. The electrode system of claim 1 further comprising means for measuring electrical potentials between said potential electrodes of said first and second electrode apparatuses.

4. The electrode system of claim 1 in which said reservoir is cylindrical in form with said opening at one end thereof and said recess from said reservoir is annular in form, said current electrodes of said electrode apparatuses are each in the form of a disc supported by said housing located at the opposite side of said reservoir from the side having the opening from the reservoir, and said potential electrodes are each in the form of a ring located in said annular recess of said first and second electrode apparatus.

5. The electrode system of claim 1 in which each of said electrodes comprises a silver base material and a surface of silver chloride.

6. The electrode system of claim 1 further comprising porous means impregnated with electrolyte closing said opening in said housing of each electrode apparatus.

7. The electrode system of claim 6 in which said porous means comprises filter paper impregnated with electrolyte.

8. The electrode system of claim 1 in which said conductive medium is a living organism.

References Cited

UNITED STATES PATENTS

| | | | |
|---|---|---|---|
| 2,370,609 | 2/1945 | Wilson et al. | 324—30 |
| 2,599,413 | 6/1952 | Reichertz | 324—30 |
| 2,733,201 | 1/1956 | Thompson | 324—30 XR |
| 2,931,977 | 4/1960 | Torstenson et al. | 324—65 |
| 2,942,176 | 6/1960 | Brownscombe et al. | 324—64 XR |
| 3,008,416 | 11/1961 | Ruehlemann | 324—71 |
| 3,302,101 | 1/1967 | Glanville | 324—64 XR |

FOREIGN PATENTS 1,204,963  1/1960  France.

RUDOLPH V. ROLINEC, *Primary Examiner.*

E. E. KUBASIEWICZ, *Assistant Examiner.*

UNITED STATES PATENT OFFICE
CERTIFICATE OF CORRECTION

Patent No. 3,382,434                                May 7, 1968

Robert J. Gibson, Jr., et al.

It is certified that error appears in the above identified patent and that said Letters Patent are hereby corrected as shown below:

Column 3, line 25, after the equation insert -- and --. Column 4, line 71, after "less" insert -- filter paper impregnated with electrolyte is placed over the --. Column 5, line 69, "GRS-r" should read -- GSR-r --.

Signed and sealed this 11th day of November 1969.

(SEAL)
Attest:

Edward M. Fletcher, Jr.
Attesting Officer

WILLIAM E. SCHUYLER, JR.
Commissioner of Patents